US007379918B2

(12) United States Patent
Tan et al.

(10) Patent No.: US 7,379,918 B2
(45) Date of Patent: May 27, 2008

(54) METHOD AND SYSTEM FOR SINGLE REACTIVATION OF SOFTWARE PRODUCT LICENSES

(75) Inventors: Xiaoxi Tan, Issaquah, WA (US); Caglar Gunyakti, Sammamish, WA (US); Ravindra Nath Pandya, Clyde Hill, WA (US); Aidan T. Hughes, Bellevue, WA (US); Kristjan Hatlelid, Sammamish, WA (US); Yue Liu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 10/903,942

(22) Filed: Jul. 30, 2004

(65) Prior Publication Data

US 2006/0026604 A1    Feb. 2, 2006

(51) Int. Cl.
    *G06Q 99/00* (2006.01)
(52) U.S. Cl. .............................. 705/59; 705/64; 705/67
(58) Field of Classification Search .................. 726/28; 705/59, 64, 67
    See application file for complete search history.

(56) References Cited

U.S. PATENT DOCUMENTS 5,375,240 A * 12/1994 Grundy ........................ 726/28

FOREIGN PATENT DOCUMENTS

JP            2002328874    * 11/2002
JP            2006048648 A  *  2/2006

OTHER PUBLICATIONS

Microsoft Partner Program, Product Activation, http://members.microsoft.com/partner/salesmarketing/partnermarket/actionpack/activatin.aspx, Jun. 24, 2004, 4 pages.
All About Activation of Adobe Software, http://www.adobe.com/activation/main.html, Jun. 24, 2004, 5 pages.
Hauser, R.C., "Does Licensing Require New Access Control Techniques?", *Conference on Computer and Communications Security, Proceedings of the 1st ACM Conference on Computer and Communications Security*, 1993, 1-8.
Zhang, X. et al., "Hiding Program Slices for Software Security", *ACM International Conference Proceeding Series, Proceedings of the International Symposium on Code Generation and Optimization: Feedback-Directed and Runtime Optimization*, 2003, 325-336.

* cited by examiner

*Primary Examiner*—Pierre Eddy Elisca
(74) *Attorney, Agent, or Firm*—Woodcock Washburn LLP (57) ABSTRACT

A method for reactivation of software products includes activating a first software product associated with a reactivation policy group. A hardware identifier derived from the computer hardware configuration is bound with the first software product activation. A second software product is activated having an associated reactivation binding list. Reactivation is requested for the first software product and an updated hardware identifier is associated with a reactivation policy group of the first software product. The second software product may be spared the request for reactivation if the second product can be associated with the reactivation of the first software product given the binding list is compatible with the reactivation policy group.

22 Claims, 4 Drawing Sheets

METHOD AND SYSTEM FOR SINGLE REACTIVATION OF SOFTWARE PRODUCT LICENSES

FIELD OF THE INVENTION

This invention relates in general to the field of computer software licensing. More particularly, this invention relates to a method of reactivation of one or more software application licenses.

BACKGROUND OF THE INVENTION

Software piracy is a large financial concern for software manufacturers. Although the current trend from software manufacturers is to grant a license to a user to personally use one or two copies of the application, users may sometimes violate the terms of the license and attempt to use the application on more than the number of licensed computers. Alternately, the software may fall into the hands of a non-licensed user who may attempt to use the software.

One method of thwarting such non-licensed activities is to require the licensed user to participate in an activation of the software application shortly after initial installation. During this process, the user provides such information as the product and serial numbers of the software back to the software manufacturer. This may be performed either on-line or over the phone by keying in digits representing the requested information. Often, the product and serial numbers are several dozen digits long. The software manufacturer can then verify that the software license for the specific product is valid. As part of the process, a hardware identifier (HWID) is typically generated which identifies not the specific user machine, but the configuration of hardware that the software is being installed onto. This HWID is logged as the initial hardware configuration that the user has upon software activation.

Generally, the manufacturer responds to the user supplied product, serial number, and HWID information with a confirmation that the information is valid. An activation code may be issued to the user computer to enable the software application to function for the user. In operation, the installed application can then verify, upon subsequent application accesses, that the hardware configuration, via the HWID, has not changed significantly. If the HWID is changed upon an application access, it may be an indication that the application has been moved to a different machine in violation of the software agreement. Under these circumstances, the user would then be prevented from accessing the application. In this way, the activation process becomes a guardian of the software license agreement by preventing use of the software application in a piracy condition.

However, the reason for the HWID change in the user computer may not have been a violation of the agreement. The change in HWID could be the result of a major hardware upgrade that the legitimate license holder is using to run her licensed software. Under those conditions, the application requires that a reactivation activity be successfully completed before the software may be accessed by the user. Reactivation requires that the user re-enter some or all of the information concerning the product and serial number information. Once again, this may be performed either on-line or via a telephone interaction which may involve dozens of digits to enter by hand. Since every application which has activation protection would require reactivation after a major hardware change, each application has the ability to stop the legitimate user from accessing his licensed software until a reactivation is performed on every application. This can be a long and arduous task, especially if performed manually via a telephone communications link.

Figure 1A:
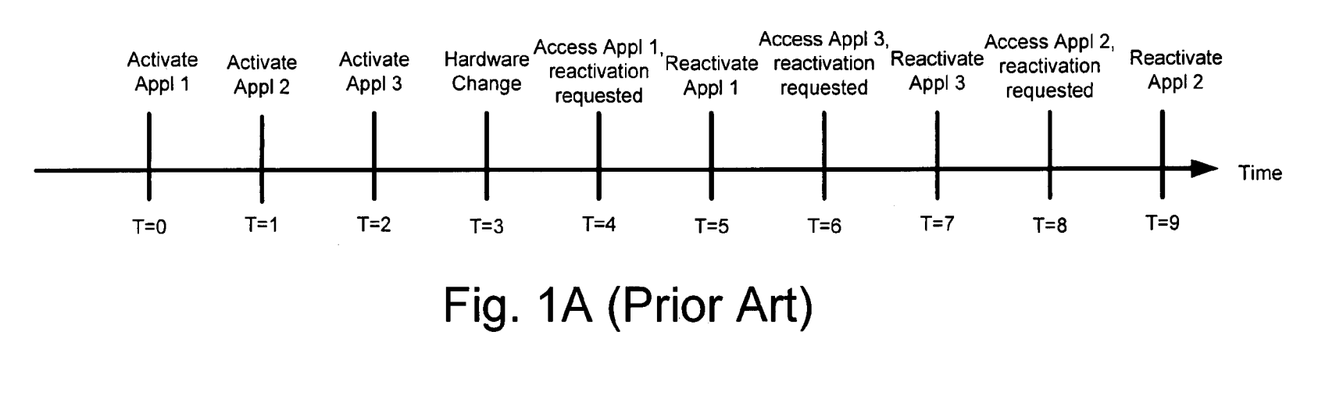
FIG. 1A is a timeline of a prior art scenario of multiple reactivations of licensed software.

FIG. 1A depicts a typical prior art scenario where multiple reactivations may occur. In this scenario, a user activates application 1 at time T=0 on a single computer. As discussed above, the activation causes a specific HWID to be constructed to indicate the hardware configuration of the computer at the time of application 1 activation. Assume no significant hardware changes are made and the user activates application 2 and application 3 at times T=1 and T=2 respectively. At time T=3, the legitimate user's computer undergoes a hardware change that jumps the threshold of tolerance set up by the anti-piracy activation software in the various applications. With the hardware change threshold exceeded, any new access of the piracy-protected applications will cause a reactivation request to occur.

At time T=4, the user accesses application 1. The application anti-piracy software detects that a significant hardware change has taken place. The application then requires the user to perform a reactivation process. The reactivation process occurs at time T=5 and the user is granted continued access to his software. The user then accesses a next application, random in order, application 3 at T=6. The piracy protected software once again detects the significant hardware change and requests reactivation. The user complies at time T=7 and reactivates application 3. At time T=8, the user access her next application, here application 2. Once again, the piracy detection software detects that significant hardware change and requests that application 2 be reactivated. The user must comply if she wishes to access application 3, so reactivation occurs at time T=9. This process may continue for each and every application that the user has installed that is associated with the original HWID.

Figure 1B:
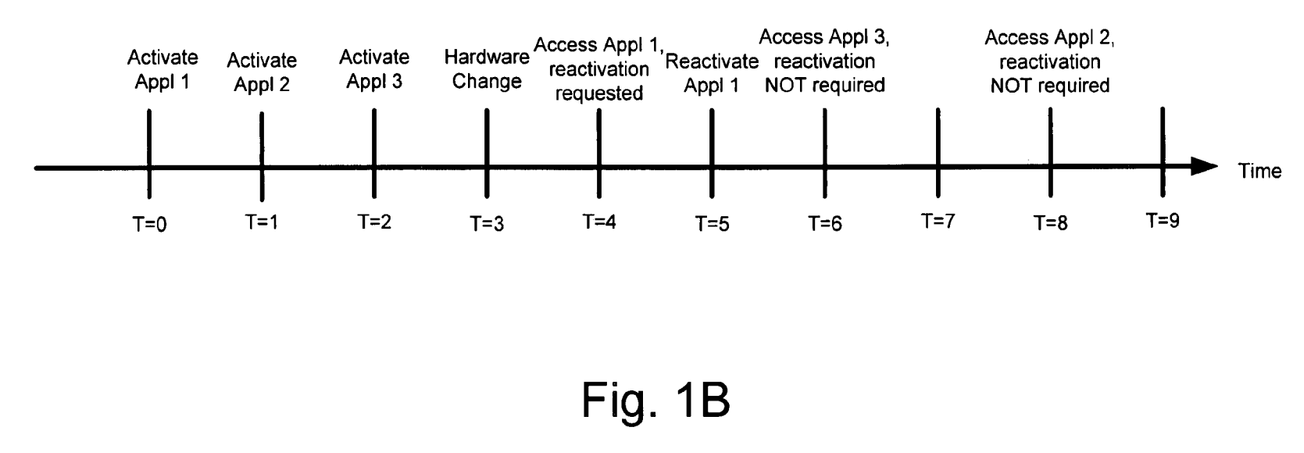
FIG. 1B is a timeline of a more desirable scenario which may greatly eliminate multiple reactivations of licensed software.

A better scenario would be that shown in FIG. 1B. Here, the same timeline is depicted for T=0 through T=5. The user activates software at T=0 thru T=2, encounters a significant hardware change at T=3, and accesses and reactivates activates application 1 at times T=4 and T=5 respectively. However, upon access to application 3 and application 2 at times T=6 and t=8 respectively, it would be more convenient to the user if a reactivation is not required. However, this scenario is not currently available to the user under present anti-piracy activation schemes; especially those using telephone link reactivation techniques.

Thus, there is a need for a method that allows a more convenient method of reactivation of legitimate software in order to save the licensed user the trouble of having to reactivate software that have compatible HWIDs. The present invention addresses the aforementioned needs and solves them with additional advantages as expressed herein.

SUMMARY OF THE INVENTION

One embodiment of the invention includes a method to reactivate a software license and have that reactivation apply to one or more additional software applications such that reactivation of the additional applications is unnecessary. Initially, activating a first application associates a first hardware identifier with a first reactivation policy group. The first application is a member of the first reactivation policy group. At least one additional application can be associated with the first hardware identifier if the additional application is compatible with the first reactivation policy group. If a first application within the reactivation policy group is reactivated, reactivation of other software applications within the reactivation policy group is unnecessary. Reactivation of the first application stores a new hardware identifier associated with the first reactivation policy group and the new hardware identifier is used by the other applications to avoid prompting the user to reactivate the other applications.

In one embodiment of the invention, the compatibility between one application and another may be found in a binding list which can allow the two applications to subscribe to the same reactivation policy group by sharing the same hardware identifier. Therefore, if an reactivation becomes necessary on one application, the other application need not be reactivated to continue to provide service to a user.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

One method of combating software piracy is to use a hardware identifier as a means whereby a software application can detect changes in the hardware environment indicative of software being moved from one machine to another. This trigger allows the software to request a reactivation of the software license. However, a customer can easily find herself reactivating each piece of software owned and licensed when a hardware upgrade forces the piracy detection software to reactivate all licenses. To avoid wasting a users time in reactivating all licensed software, one embodiment of the invention places compatible software into a single reactivation policy group.

Reactivation policy groups allow one reactivation of a software application to suffice for all software applications belonging to the policy group. There may be many policy groups; each having a different tolerance to hardware changes or having different trust chains. The reactivation may be performed over a telephone or on-line. The invention enables a single reactivation to be effective for all applications in a policy group and can dramatically improve the software activation customer experience and can be an add-on to an existing product activation technology.

Exemplary Embodiments of the Invention

Figure 2:
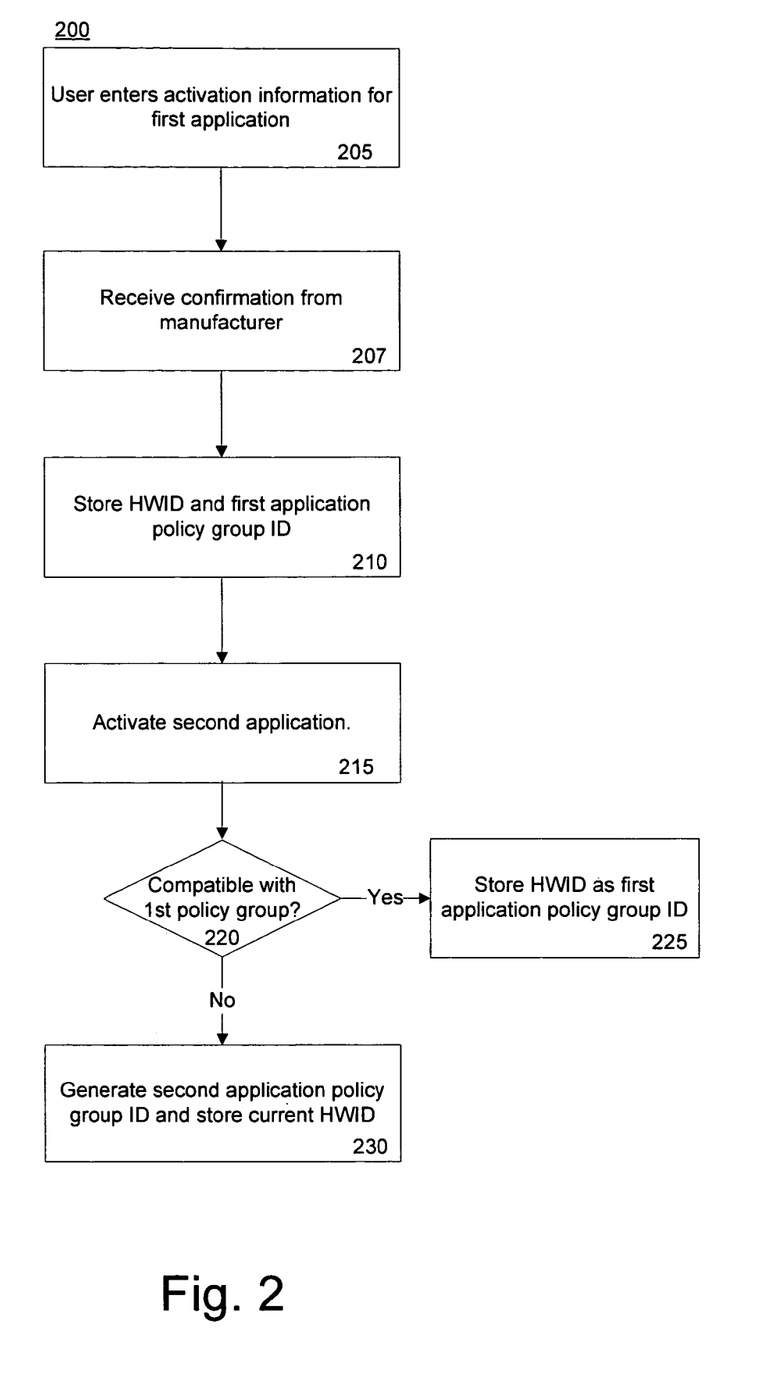
FIG. 2 is a flow diagram of an activation aspect of the invention.

FIG. 2 depicts a flow diagram 200 showing the activation aspect of the invention. Initially, a user activates a software license on a computer by entering in such information as the product identifier and the serial number of the software purchased (step 205). The information may be sent via an on-line connection or via telephone link where the customer uses a telephone keypad to enter the information. Also transmitted is a hardware identifier (HWID) representing the hardware configuration state of the user computer at the time the licensed software is activated. This HWID is generally stored in a server along with information concerning the product identifier and the serial number of the product. A confirmation is sent to the user computer that enables the software for use and the HWID is stored along with an software application policy indication (step 207).

A software license reactivation policy exists such that other compatible software applications can share the same reactivation policy. For example, if there are several different applications from the same software manufacturer that have the same hardware change tolerance, then they can potentially share the same reactivation policy. By grouping these applications under a single policy, all compatible applications can use the same policy. Software applications that have a different hardware change tolerance or that have different trust chains may be provided with or can fit into a different reactivation policy group. According to an aspect of the invention, a software application can either host a reactivation policy group or can join one that already exists on a computer system. One method to join a group can be a compatibility comparison of HWIDs. In the flow diagram of FIG. 2, it is assumed that a previously installed reactivation policy group does not exist and that the first application establishes the reactivation policy group. Returning to FIG. 2, the HWID can then be stored in the user computer (step 210) at time of activation along with the corresponding software reactivation policy group information for the first application. As noted above, the same information may also be stored in a software manufacturer server.

Likewise, a second application may be activated on the user computer by entering in the software serial number and product identifier (step 215). In one aspect of the invention, the second application may be checked against the first reactivation policy group to see if there is a compatibility (step 220). In this instance a comparison between the second application software reactivation policy group and the first reactivation policy group is made to determine of they are compatible. If they are not compatible, then a second software application policy group indication is stored along with the HWID of the present computer hardware configuration (step 230). If the software reactivation policy groups are compatible, then the second application is given the HWID of the first application policy group along with an indication of the first reactivation policy (step 225). Note that the second application is activated at least once before it can join the single reactivation policy group. This assumes that the first application is still bound to the reactivation policy group it established.

As mentioned above, a test may be performed to check if the second application is compatible with the first application. This test may be a check of a hardware change tolerance or trust chain provided in association with the reactivation policy group. If the second application has a binding list that lists applications that it trusts and the first application is a member of the list, and if the hardware change tolerance is acceptable, then the second application may join the reactivation policy group of the first application and store the first application HWID as its own (step 225). Compatibility of software applications may be accomplished using a binding list. A binding list is a listing provided along with an application that lists known compatible applications. Such a list from a given manufacturer may include applications that a manufacturer normally bundles together to form a suite of applications. Microsoft Office™ available from Microsoft® Corporation of Redmond, Wash. is an example of such a suite of applications. In this example, the applications of Word, Excel, Power Point, Outlook, Access, and Visio may have the same hardware change tolerance for licensing purposes and be candidates for placement in a single reactivation policy group via a binding list. Any other application, including applications that the manufacturer does not produce, may be placed into a binding list. The binding list can be accessed at the time an application reactivation is required in order to assess whether or not a different application is compatible with the software reactivation policy group license being reactivated.

Figure 3:
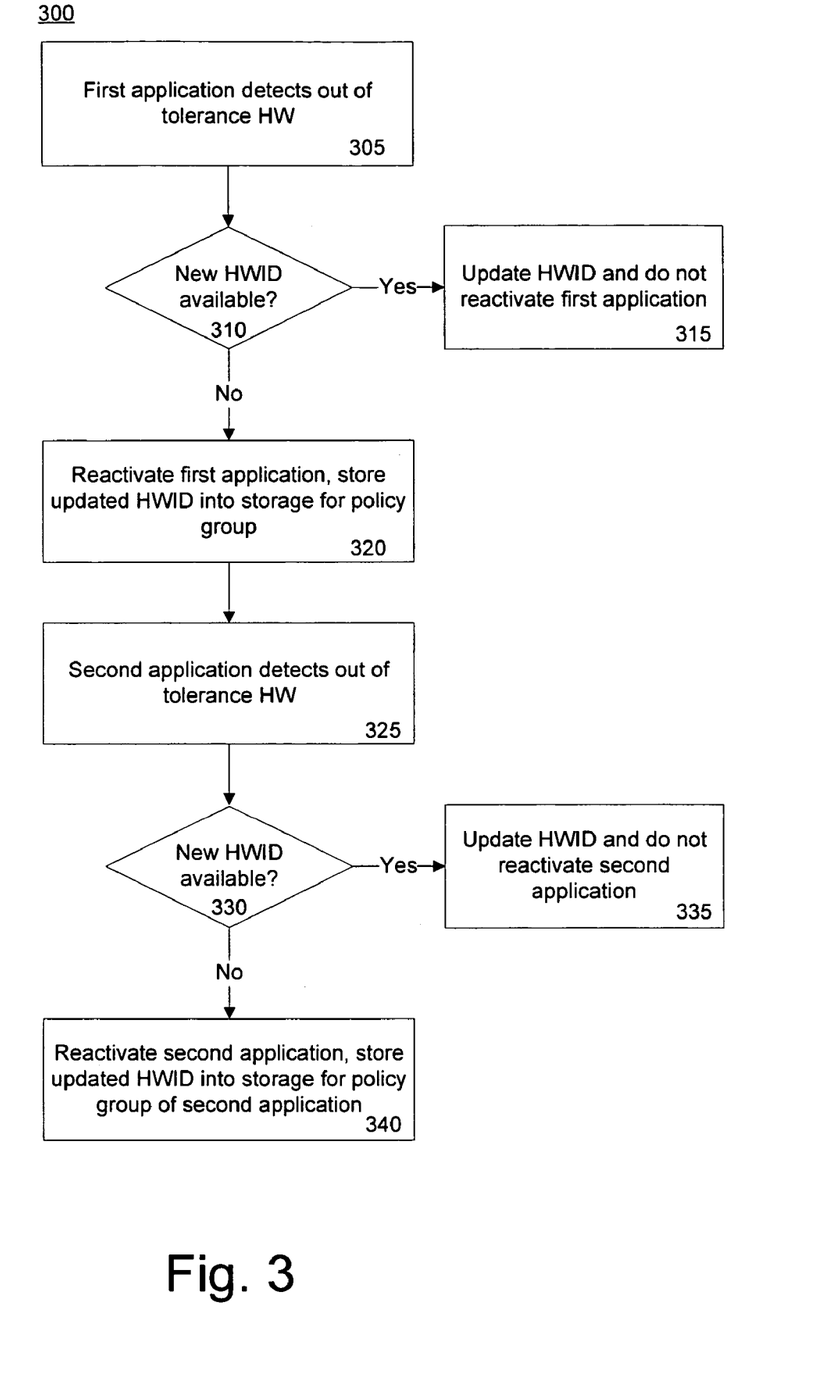
FIG. 3 is a flow diagram of a reactivation aspect of the invention.

FIG. 3 is a flow diagram 300 showing the single reactivation aspect of the invention. Assume the user referenced with respect to FIG. 2 has made hardware changes to her computer. Assume also that the hardware changes exceed the hardware change threshold that exists for the single reactivation policy group. If the user accesses any application within the now out-of-tolerance reactivation policy group, for example, the first application, then the activation software will detect the significantly changed hardware environment (step 305). In this step, the HWID that was stored in a location accessible to the first application (trusted store) is compared the currently generated HWID. The product reactivation software now checks the reactivation policy group to find if an updated HWID has been stored in association with the other member application of the same reactivation policy group (step 310). If there is a more recent HWID that is available and that newer HWID does not exceed the hardware change tolerance, then the first application adopts the latest HWID and a reactivation need not be performed (step 315).

If there is no newer HWID that falls within the tolerance of the first policy group reactivation policy, then the first application must be reactivated (step 320) because it is out of hardware tolerance and the out of tolerance condition may indicate that the software was pirated. As part of the successful reactivation, a newer and current HWID is generated and placed into storage associated with the first reactivation policy group (step 320) after confirmation is received from the application manufacturer. Subsequently, a second application is accessed and an out-of-tolerance hardware configuration is detected (step 325). Once again, the out-of-tolerance hardware indication is produced by comparing the current HWID against the stored HWID corresponding to the second software application at the time of its activation. The product reactivation software then searches the second application reactivation policy group to see if another, newer HWID exists for that policy group (step 330). In this instance, assuming that the first application and the second application belong to the same reactivation policy group, the product reactivation software is able to find a newer HWID that corresponds with the policy group. That newer HWID is the result of the reactivation of the first application. Having detected the newer, within tolerance, HWID, no reactivation need be requested for the second application (step 335). In this manner the user is spared a reactivation on the second application because the first and second applications subscribe to the same reactivation policy group and that policy group was reactivated previously in step 320. Consequently, no new reactivation need be performed for the second application at step 335.

However, if the first and second applications did not belong to the same reactivation policy group, then a reactivation of the second application is required with its commensurate generation of a new HWID for the second application policy (step 340). In accordance with an aspect of the invention, any other application compatible with the second policy group of which the second application is a subscriber would not have to be reactivated if subsequently accessed by the user.

In another embodiment of the invention, a HWID may be a pseudo-unique universal hardware identifier so as not to specifically identify the a specific user machine. This approach has the advantage of lessening user privacy concerns. Generally, a HWID is not constant and is subject to hardware configuration changes in that the identifier changes in response to computer hardware changes. A HWID may be a hash of values representing the hardware configuration of a group of computers. When a user software application is activated, the HWID representing the computer hardware configuration at the time of activation and a single reactivation policy group may be created as a link and stored in a trusted store. This assumes that the software application host a reactivation policy group. According to an aspect of the invention, an application can host a reactivation policy group, a binding list, or both.

Co-Pending patent application Ser. No. 10/706,018 filed Nov. 12, 2003 entitled "Obfuscated State Store For Rights Management System And The Like" commonly assigned with the present application is incorporated by reference. The co-pending application discloses a state information store which is stored on an a users computer. This state information can be used as a hardware configuration identifier. Information at least nearly unique to the configuration of the computing device can be obtained, and a number of locations at which at least a portion of the state store is to be stored can be determined. Pseudo-random file names and corresponding paths can be generated based at least in part on the obtained information whereby the generated file names and corresponding paths are likewise at least nearly unique to the computing device. The generated file names and path are paired to form the locations. Thereafter, the state store is stored according to the generated locations. Use of this technique allows a HWID to be generated and stored on a user computer with little chance that a user can discover the location. Using this arrangement helps prevent a user from obtaining access to the HWID information and altering it to disable the piracy protection mechanism of reactivation after a significant hardware configuration change.

In one embodiment, the trusted and covert storage location used in the above mentioned scheme is persistent on the user or client side and is linked to a software manufacturer's server signed universal pseudo-unique HWIDs. When the client side HWID stays unchanged and a new pseudo-unique HWID is activated by the reactivation process of a trusted software product, any other software products activated with old pseudo-unique HWID will not require reactivation according to aspects of the current invention.

In one embodiment of the invention, reactivation policy groups are generated in XrML (eXtensible Right Markup Language) to express different policy groups. In other embodiments, a reactivation policy group may be generated using any other suitable generation method known to those of skill in the art. As an aspect of the invention, a single reactivation for a group of software products is possible if that group shares the same licensing hardware change tolerance policy. Software products within these policy groups can be specified as either a bi-directional trust or uni-directional trust. In a bi-directional trust, all software products can be reactivated if the corresponding piece of hardware is reactivated by any one of the software products in the group. In a uni-directional trust, all software products are reactivated only if the corresponding piece of hardware is reactivated by one or more specified software products in the group. In one embodiment, there may be authentication mechanisms in joining these bi-directional or uni-directional policy groups.

As mentioned above, a software application may host a reactivation policy group, a binding list, or both. Thus, two applications installed and activated on a computer at different times may find themselves cover by two different reactivation policy groups. However, if the two applications have a compatible relationship, such as a binding list including the other application, then the two applications can eventually be synchronized into the same reactivation policy group. This event may occur if a reactivation event is warranted for one of the applications. This reactivation event request may be triggered by a user computer hardware change driving the policy group out of tolerance. After a reactivation of the out-of-tolerance application, a new HWID is provided in association with the reactivation policy group for the application. Upon access of a second application which becomes out of tolerance from a second reactivation policy group, a compatibility check may be performed and the second application may find that it is compatible with the first policy group. The second application may then join that first group and thus become in sync with the first application by adopting its reactivation HWID. Thus, a reactivation of the second application becomes unnecessary as the second application gets the benefit from the first application policy group, its HWID, and a binding list that has listed the compatible applications.

Exemplary Computing Device

Figure 4:
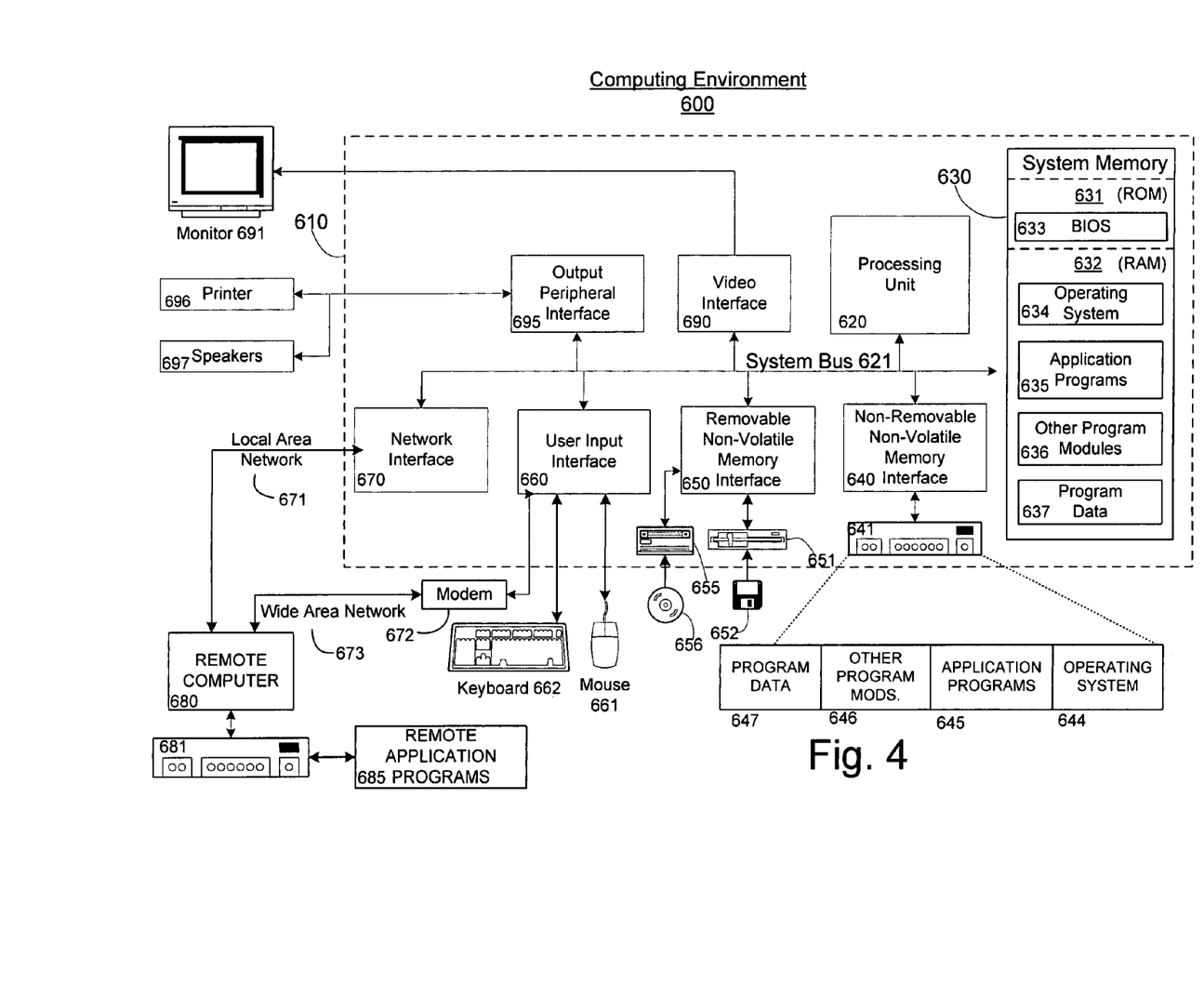
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. While a general purpose computer is described below, this is but one example, and embodiments of the invention may be implemented with other computing devices, such as a client having network bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 4, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 4 illustrates operating system 634, application programs 635, other program modules 636, and program data 637.

The computer system 610 may also include other removable/non-removable, volatile/nonvolatile computer storage media. By way of example only, FIG. 4 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 4 provide storage of computer readable instructions, data structures, program modules and other data for the computer system 610. In FIG. 4, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 4. The logical connections depicted in FIG. 4 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 4 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement an anti-piracy software mechanism. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A method for reactivation of software products, the method comprising:
   requesting activation of a first software product, wherein the first software product hosts a reactivation policy group;
   associating a first hardware identifier with the first software product;
   requesting activation of a second software product, wherein the second software product has a binding list;
   associating the second software product with the first hardware identifier if the binding list of the second software product indicates a compatibility with the first software product, wherein associating the second software product with the first hardware identifier comprises a binding list indicating compatibility with at least one of the reactivation policy group and the first software product;
   requesting a reactivation event of the first software product;
   ascribing the reactivation event of the first software product to the second software product, thereby avoiding a request for reactivation event of the second software product;
   wherein compatibility with the reactivation policy group is indicated by comparison of a current hardware identifier with the first hardware identifier against a hardware change tolerance associated with the reactivation policy group.

2. The method of claim 1, wherein requesting activation of a first software product further comprises requesting activation of a first software product on a computer, the computer having the first hardware identifier stored in memory.

3. The method of claim 2, wherein the hardware identifier comprises a representation of a hardware configuration at a time of activation of the first software product.

4. The method of claim 3, wherein the representation comprises a hash value of component identifiers installed on the computer.

5. The method of claim 1, wherein a reactivation policy group identifier is stored in memory in association with the first hardware identifier.

6. A method for reactivation of software products, the method comprising:
   requesting activation of a first software product, wherein the first software product hosts a reactivation policy group;
   associating a first hardware identifier with the first software product;
   requesting activation of a second software product, wherein the second software product has a binding list;
   associating the second software product with the first hardware identifier if the binding list of the second software product indicates a compatibility with the first software product;
   requesting a reactivation event of the first software product;
   ascribing the reactivation event of the first software product to the second software product, thereby avoiding a request for reactivation event of the second software product;
   wherein requesting activation of the first software product further comprises hosting the reactivation policy group comprising a hardware change tolerance which triggers a reactivation event if the hardware change tolerance is exceeded and the first software product is accessed.

7. The method of claim 6, further comprising associating a second hardware identifier with the reactivation policy group after reactivation the first software product.

8. The method of claim 6, wherein the second hardware identifier represents a hardware configuration at the time of the reactivation of the first software product.

9. A method for reactivation of software products, the method comprising:
   requesting activation of a first software product, wherein the first software product hosts a reactivation policy group;
   associating a first hardware identifier with the first software product;
   requesting activation of a second software product, wherein the second software product has a binding list;
   associating the second software product with the first hardware identifier if the binding list of the second software product indicates a compatibility with the first software product;
   accessing the first software application;
   comparing a current hardware identifier against the first hardware identifier to produce a hardware difference indication;

requesting a reactivation data transaction if the hardware difference indication is greater than a hardware change tolerance associated with the reactivation policy group; and ascribing the reactivation event of the first software product to the second software product, thereby avoiding a request for reactivation event of the second software product.

10. A method to reactivate multiple software applications, the method comprising:

requesting an activation of a first application and associating a first hardware identifier with a reactivation policy group, the first application owning the reactivation policy group;

requesting an activation of at least one additional application and associating the at least one additional application with the first hardware identifier if the at least one additional application is compatible with the reactivation policy group, wherein associating the at least one additional application with the first hardware identifier further comprises using a reactivation binding list to associate the at least one additional application with the first application if a current hardware configuration identifier is within a tolerance of the first hardware identifier wherein the tolerance is associated with the reactivation policy group;

requesting a reactivation of any one of the applications; and determining that the reactivation of remaining applications is unnecessary if the remaining applications are associated with the reactivation policy group.

11. The method of claim 10, further comprising:
associating a second hardware identifier with the reactivation policy group after reactivation of any one of the applications.

12. A system comprising:
a processor having access to memory, the memory having instructions which, when executed, perform the method comprising:

comparing a current hardware identifier against a first hardware identifier when a first software application is accessed, the first hardware identifier associated with a reactivation policy group upon activation of the first software application;

requesting a reactivation of the first application if the current hardware identifier exceeds a threshold of difference from the first hardware identifier;

associating the current hardware identifier with the reactivation policy group;

determining that the reactivation of at least one other software application is unnecessary if the at least one other software application is bound with the reactivation policy group via a bonding list of the at least one other software application, the bonding list associating the at least one other software application with a first software application if a comparison of a current hardware identifier with the first hardware identifier is within a hardware change tolerance associated with the reactivation policy group.

13. The system of claim 12, wherein the first hardware identifier is stored in a trusted store.

14. The system of claim 12, wherein the first hardware identifier comprises a hash value.

15. The system of claim 12, wherein the binding list of the at least one other software application lists a first software application identifier.

16. A computer-readable medium having computer-executable instructions for performing a method, the method comprising:

requesting activation of a first software product, wherein the first software product hosts a reactivation policy group comprising a hardware change tolerance which triggers a reactivation event if the hardware change tolerance is exceeded and the first software product is accessed;

associating a first hardware identifier with the first software product;

requesting activation of a second software product, wherein the second software product has a binding list;

associating the second software product with the first hardware identifier if the binding list of the second software product indicates a compatibility with the first software product;

requesting a reactivation event of the first software product;

ascribing the reactivation event of the first software product to the second software product, thereby avoiding a request for reactivation event of the second software product.

17. The computer-readable medium of claim 16, wherein the step of associating the second software product with the first hardware identifier comprises a binding list indicating compatibility with at least one of the reactivation policy group and the first software product.

18. The computer-readable medium of claim 16, further comprising the step of associating a second hardware identifier with the reactivation policy group after reactivation the first software product.

19. The computer-readable medium of claim 18, wherein the second hardware identifier represents a hardware configuration at the time of the reactivation of the first software product.

20. A computer-readable medium having computer-executable instructions for performing a method, the method comprising:

requesting activation of a first software product, wherein the first software product hosts a reactivation policy group;

associating a first hardware identifier with the first software product;

requesting activation of a second software product, wherein the second software product has a binding list;

associating the second software product with the first hardware identifier if the binding list of the second software product indicates a compatibility with the first software product;

accessing the first software application;

comparing a current hardware identifier against the first hardware identifier to produce a hardware difference indication;

requesting a reactivation data transaction if the hardware difference indication is greater than a hardware change tolerance associated with the reactivation policy group; and ascribing the reactivation event of the first software product to the second software product, thereby avoiding a request for reactivation event of the second software product.

21. A computer-readable medium having computer-executable instructions for performing a method, the method comprising:

requesting an activation of a first application and associating a first hardware identifier with a reactivation policy group, the first application owning the reactivation policy group;

requesting an activation of at least one additional application and associating the at least one additional application with the first hardware identifier if the at least one additional application is compatible with the reactivation policy group, and using a reactivation binding list to associate the at least one additional application with the first application if a current hardware configuration identifier is within a tolerance of the first hardware identifier wherein the tolerance is associated with the reactivation policy group;

requesting a reactivation of any one of the applications; and determining that the reactivation of remaining applications is unnecessary if the remaining applications are associated with the reactivation policy group.

22. The computer-readable medium of claim 21, further comprising the step of:

associating a second hardware identifier with the reactivation policy group after reactivation of any one of the applications.

* * * * *